(12) United States Patent
Matsumoto et al.

(10) Patent No.: US 11,551,419 B2
(45) Date of Patent: Jan. 10, 2023

(54) METHOD OF GENERATING THREE-DIMENSIONAL MODEL, TRAINING DATA, MACHINE LEARNING MODEL, AND SYSTEM

(71) Applicant: Preferred Networks, Inc., Tokyo (JP)

(72) Inventors: Eiichi Matsumoto, Tokyo (JP); Hironori Yoshida, Tokyo (JP); Hiroharu Kato, Tokyo (JP)

(73) Assignee: Preferred Networks, Inc., Tokyo (JP)

( * ) Notice: Subject to any disclaimer, the term of this patent is extended or adjusted under 35 U.S.C. 154(b) by 0 days.

(21) Appl. No.: 17/226,214

(22) Filed: Apr. 9, 2021

(65) Prior Publication Data

US 2021/0225078 A1 Jul. 22, 2021

Related U.S. Application Data

(63) Continuation of application No. PCT/JP2019/039868, filed on Oct. 9, 2019.

(30) Foreign Application Priority Data

Oct. 10, 2018 (JP) .............................. JP2018-191935

(51) Int. Cl.
*G06T 17/20* (2006.01)
*G06T 7/55* (2017.01)
*G06T 19/00* (2011.01)

(52) U.S. Cl.
CPC ............... *G06T 17/20* (2013.01); *G06T 7/55* (2017.01); *G06T 19/006* (2013.01); *G06T 2207/10028* (2013.01)

(58) Field of Classification Search
CPC ......... G06T 17/20; G06T 7/55; G06T 19/006; G06T 2207/10028; G06T 1/00; G06T 17/00; G06T 2207/10021; G06T 2207/10152; G06T 2200/08; G06T 2207/30208; G06T 2207/10024; G06T 19/00; G06T 2207/20084; G06T 2207/20081; G06T 19/20; G06T 2200/04;
(Continued)

(56) References Cited

U.S. PATENT DOCUMENTS 9,665,800 B1 * 5/2017 Kuffner, Jr. .......... G06V 20/653
9,807,373 B1 * 10/2017 Bruce .................... G01B 11/24
(Continued)

FOREIGN PATENT DOCUMENTS

JP 2005-195335 7/2005
JP 2009-139268 6/2009
(Continued)

OTHER PUBLICATIONS

Yoshiyuki Nakajima, "3D, Beyond the Display", Publisher: ITmedia, published on Jun. 16, 2004,<https://www.itmedia.co.jp/news/articles/0406/16/news081_2.html>.
(Continued)

*Primary Examiner* — Xilin Guo
(74) *Attorney, Agent, or Firm* — IPUSA, PLLC

(57) ABSTRACT

A method of generating a three-dimensional model of an object, is executed by a processor. The method includes executing rendering of the three-dimensional model of the object based on an image captured by the imaging device; and modifying the three-dimensional model.

28 Claims, 5 Drawing Sheets

(58) Field of Classification Search
CPC . G06T 15/00; G06T 2207/10016; G06T 7/70; G06T 15/08; G06T 2207/30204; G06T 7/292; G06N 3/08; G06F 3/0346

See application file for complete search history.

(56) References Cited

U.S. PATENT DOCUMENTS

| | | | |
|---|---|---|---|
| 10,789,723 B1* | 9/2020 | Kopf | G06N 20/00 |
| 10,839,557 B1* | 11/2020 | Arora | G06T 19/006 |
| 2013/0053702 A1 | 2/2013 | Pfeiffer et al. | |
| 2016/0239952 A1 | 8/2016 | Tanaka | |
| 2017/0287162 A1 | 10/2017 | Wasik et al. | |
| 2018/0232471 A1* | 8/2018 | Schissler | G06V 20/20 |
| 2019/0026958 A1* | 1/2019 | Gausebeck | G06T 7/521 |
| 2019/0087985 A1 | 3/2019 | Li et al. | |
| 2019/0362541 A1* | 11/2019 | Balestra | G06V 10/141 |
| 2021/0031459 A1* | 2/2021 | Jessen | B33Y 50/02 |

FOREIGN PATENT DOCUMENTS

| | | |
|---|---|---|
| JP | 2017-509035 | 3/2017 |
| JP | 2017-532695 | 11/2017 |
| WO | 2013/071416 | 5/2013 |
| WO | 2015/045834 | 4/2015 |
| WO | 2015/102637 | 7/2015 |

OTHER PUBLICATIONS

Ken Shioda, "It fits perfectly on every person's leg. Comfort shoes customized with 3D Scanners", Publisher:IGNITE, published on May 1, 2017,<https://www.excite.co.jp/News/economy_clm/20170501/Ignite_094636.html>.

Tzu-Mao Li et al.,"Differentiable Monte Carlo Ray Tracing through Edge Sampling", Sep. 21, 2018 version, <https://web.archive.org/web/20180921052138/https://people.csail.mit.edu/tzumao/diffrt/>.

Shichen Liu et al.,"Differentiable Rendering for unsupervised Single-View Mesh Reconstruction", revised on Jan. 23, 2019.

Wenzheng Chen et al.,"Learning to Predict 3D Objects with an Interpolation-based Differentiable Renderer", revised on Nov. 21, 2019.

Hiroharu Kato et al.,"Neural 3D Mesh Renderer", revised on Nov. 20, 2017.

Hiroharu Kato et al.,"Neural 3D Mesh Renderer", part of the Lecture Notes presented at CVPR2018, Jul. 29, 2018.

Matthew M. Loper et al.,"OpenDR: An Approximate Differentiable Renderer", Max Planck Institute for Intelligent Systems, Tubingen, Germany, part of the Lecture Notes in Computer Sciencebook series P154-169, Publisher: Springer, Cham, published on 2014.

Capturing Reality,"Complete photogrammetric documentation of architecture",Slovakia, Mar. 9, 2021 version, Author unlisted <https://web.archive.org/web/20210309200756/https://www.capturingreality.com/photogrammetry-documentation-architects>.

Richard A. Newcombe et al.,"KinectFusion: Real-Time Dense Surface Mapping and Tracking", Apr. 14, 2017 version <https://web.archive.org/web/20170414190910/https://www.microsoft.com/en-us/research/wp-content/uploads/2016/02/ismar2011.pdf>.

Junyi Pan et al.,"Deep Mesh Reconstruction from Single RGB Images via Topology Modification Networks", revised on Sep. 1, 2019.

Hiroharu Kato et al.,"Neural 3D Mesh Renderer", Jun. 2018 <https://web.archive.org/web/20200920130627/https://hiroharu-kato.com/publication/neural_renderer/>.

Tzu-Mao Li et al., "Differentiable Monte Carlo Ray Tracing through Edge Sampling," ACM Trans. Graph., vol. 37, No. 6, Article 222. Publication date: Nov. 2018.

* cited by examiner

METHOD OF GENERATING THREE-DIMENSIONAL MODEL, TRAINING DATA, MACHINE LEARNING MODEL, AND SYSTEM

CROSS-REFERENCE TO RELATED APPLICATIONS

The present U.S. non-provisional application is a continuation application of and claims the benefit of priority under 35 U.S.C. § 365(c) from PCT International Application PCT/JP2019/039868 filed on Oct. 9, 2019, which is designated the U.S., and is based upon and claims the benefit of priority of Japanese Patent Application No. 2018-191935, filed on Oct. 10, 2018, the entire contents of which are incorporated herein by reference.

TECHNICAL FIELD

The present disclosure may relate to a three-dimensional scanning device, a method of generating a three-dimensional model, training data, and a machine learning model.

SUMMARY

According to one aspect of an embodiment of the present inventive concept, a method of generating a three-dimensional model of an object, is executed by a processor. The method may include executing rendering of the three-dimensional model of the object to be scanned based on at least one image captured by the imaging device; and modifying the three-dimensional model.

EMBODIMENTS OF THE INVENTION

Figure 1:
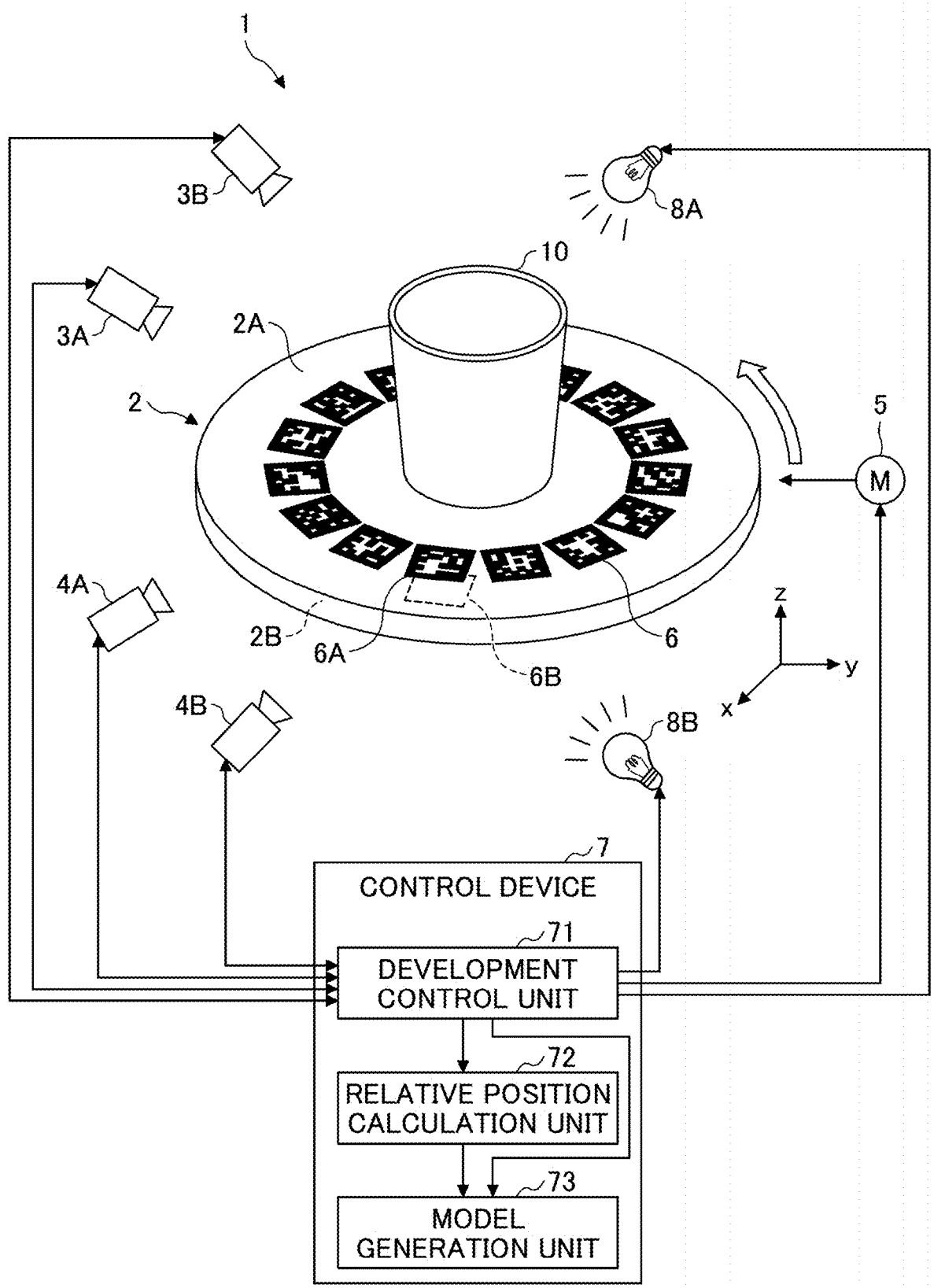
FIG. 1 is a schematic diagram illustrating a general configuration of a three-dimensional scanning device according to an embodiment.

According to the present disclosure, a novel method of three-dimensional scanning can be provided.

In the following, an embodiment will be described with reference to the accompanying drawings. To facilitate understanding of the description, the same elements have the same reference numerals assigned throughout the drawings as far as possible, to omit duplicated description.

In the drawings, the x-direction, the y-direction, and the z-direction are perpendicular to one another. The z-direction is a direction corresponding to the axis of rotation of a support table 2, and is typically the vertical direction. The positive side in the z-direction is designated as the upper side, and the negative side in the z-direction is designated as the lower side. The x-direction and the y-direction correspond to extending directions of a top surface 2A of the support table 2, and are typically horizontal directions. Note that each of the terms "vertical direction", "perpendicular direction", "horizontal direction", and the like used in the present embodiment, includes one direction associated with the term and directions within a predetermined range that includes the one direction.

Figure 2:
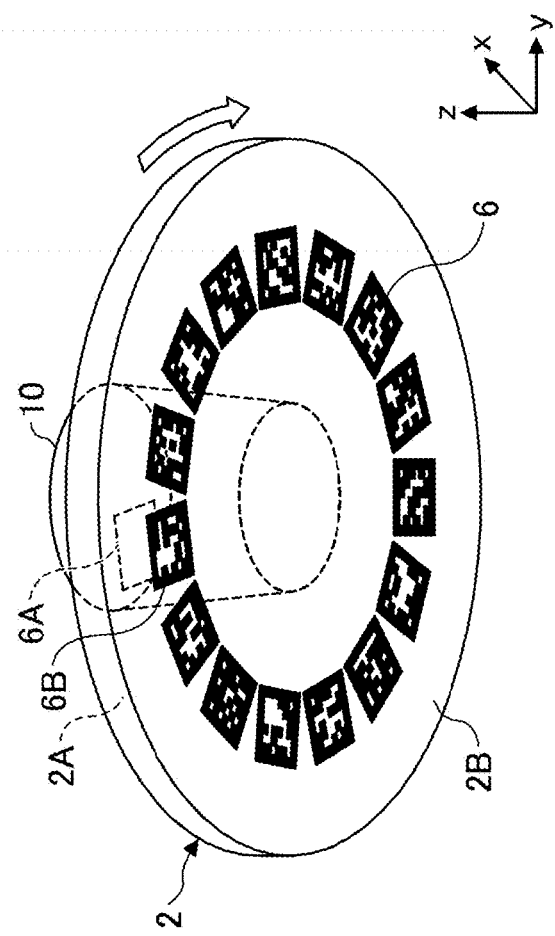
FIG. 2 is a schematic diagram illustrating the bottom surface side of a support table in FIG. 1.

With reference to FIG. 1 and FIG. 2, a configuration of a three-dimensional scanning device 1 according to an embodiment will be described. FIG. 1 is a schematic diagram illustrating a general configuration of a three-dimensional scanning device 1 according to the embodiment; and FIG. 2 is a schematic diagram illustrating the bottom surface 2B side of a support table 2 in FIG. 1.

The three-dimensional scanning device 1 may be a device that scans an object to be scanned 10 to capture multiple image data items of the imaged object to be scanned 10, and synthesizes the image data items, to generate a three-dimensional model. The object to be scanned 10 includes objects in any shape and having a size that can be placed inside AR markers 6 of the support table 2, for example, a container such as a cup as exemplified in FIG. 1. Also, the scanning direction of the object to be scanned 10 may be, for example, a circumferential direction around the z direction as the central axis. Note that the object to be scanned 10 is not limited to having a size that can be placed inside the AR markers 6 of the support table 2.

As illustrated in FIG. 1, the three-dimensional scanning device 1 may include the support table 2 (support part), upper cameras 3A and 3B (second image sensors), lower cameras 4A and 4B (first image sensors), a turning part 5, the AR markers 6 (relative position indicators), a control device 7, and lights 8A and 8B.

The support table 2 may be a pedestal on which the object to be scanned 10 is placed, to turn around the placed object to be scanned 10. The support table 2 may be, for example, a transparent plate such as an acrylic plate. The top surface 2A of this transparent plate may be a placement surface on which the object to be scanned 10 is placed. Also, as the support table 2 is a transparent plate, the object to be scanned 10 placed on the top surface 2A can be imaged (hereafter, also referred to as "visual recognized") from a bottom surface 2B as the backside of the placement surface as illustrated in FIG. 2. Note that the support table 2 may be formed of a material that is translucent or light-permeable to a certain extent, as long as the object to be scanned 10 can be imaged, or information on the object to be scanned 10 can be obtained from the bottom surface 2B side.

The upper cameras 3A and 3B may be installed over the top surface 2A side of the support table 2, and can capture images of the object to be scanned 10 when being oriented toward the object to be scanned 10 in obliquely upward directions with respect to the placement surface 2A. The upper cameras 3A and 3B may be installed at different tilt angles. Note that in the present embodiment, the "obliquely upward direction with respect to the placement surface 2A" is a direction extending above the placement surface 2A and tilted outward with respect to the vertical axis at the center at which the object to be scanned 10 is placed on the support table 2. In other words, each of the upper cameras 3A and 3B according to the present embodiment obtains information in a direction other than a direction right above or right beside the object to be scanned 10.

The lower cameras 4A and 4B may be installed on the bottom surface 2B side of the support table 2, and can captured images of the object to be scanned 10 when being oriented toward the object to be scanned 10 in obliquely downward directions with respect to the placement surface 2A. The lower cameras 4A and 4B may be installed at different tilt angles. Note that in the present embodiment, the "obliquely downward direction with respect to the placement surface 2A" is a direction extending below the bottom surface 2B of the support table 2 and tilted outward with respect to the vertical axis at the center of the support table 2. In other words, each of the lower cameras 4A and 4B according to the present embodiment obtains information in a direction other than a direction right below the object to be scanned 10.

The upper cameras 3A and 3B and the lower cameras 4A and 4B are examples of image sensors that capture images of the object to be scanned 10. The upper cameras 3A and 3B and the lower cameras 4A and 4B may be, for example, RGB-D cameras that are capable of capturing RGB images and depth images of the object to be scanned 10. A depth image may include information on depth (depth) to the object to be scanned 10. Note that in the following, the upper cameras 3A and 3B may be also collectively referred to as the "upper cameras 3", and the lower cameras 4A and 4B may be also collectively referred to as the "lower cameras 4".

In the present embodiment, the "image sensor" may mean an element that can capture RGB images and/or depth images of the object to be scanned 10, and may include all camera devices such as RGB-D cameras and depth cameras, sensors such as CMOS sensors and depth sensors built into camera devices, and sensors used as stand-alone elements. Also, the "image sensor" may be configured to obtain point cloud information by a laser scanner.

The turning part 5 according to the present embodiment may turn the support table 2 around approximately the center of the support table 2. An existing power transmission system can be used for the mechanism of the turning part 5. For example, the turning part 5 may be configured to include a motor and a gear mechanism so as to transfer the driving force of the motor to the axis of rotation of the support table 2 through the gear mechanism, or may be configured to turn the support table 2 around by giving the driving force to the outer edge of the support table 2.

The AR markers 6 are an example of indicators that indicate the relative positions of the object to be scanned 10 with respect to the upper cameras 3A and 3B and the lower cameras 4A and 4B. In the present embodiment, the AR markers 6 are arranged on the top surface 2A and the bottom surface 2B of the support table 2 around the placement position of the object to be scanned 10.

The AR markers 6 may be images of predetermined patterns serving as labels in an image recognition-type AR (Augmented Reality) system. The AR markers 6 may be typically rectangular, and may have two-dimensional bit patterns in two colors of black and white, and marker IDs can be recognized by simple image recognition. In the present embodiment, the AR markers 6 having a flat surface are used, and the distance, angle, and the like with respect to a camera are calculated from the shapes, such as the degree of distortion of images when captured with the camera; also, the AR markers 6 may be used in a way so as to display 3DCG or the like at the marker positions, based on the obtained information.

Also in the present embodiment, as illustrated in FIG. 1, the AR markers 6 have rectangular-shaped planar bit patterns. The multiple AR markers 6 arranged around the object to be scanned 10 may have bit patterns different from one another, and may record, for example, information on angles of rotation from the reference markers 6A and 6B serving as reference positions in the turning direction. The reference markers 6A and 6B may be markers at the reference positions among the group of AR markers arranged on the top surface 2A and on the bottom surface 2B, respectively, and may have approximately the same position in the circumferential direction.

The control device 7 may control operations of the three-dimensional scanning device 1. The control device 7 according to the present embodiment may control scanning of the object to be scanned 10 executed by the upper cameras 3A and 3B and the lower cameras 4A and 4B. Also, the control device 7 may generate a three-dimensional model of the object to be scanned 10, based on captured image data obtained by the scanning. As functional units related to these functions, the control device 7 may include an imaging control unit 71, a relative position calculation unit 72, and a model generation unit 73.

The imaging control unit 71 according to the present embodiment may control operations of the turning part 5, and the upper cameras 3A and 3B and the lower cameras 4A and 4B, to scan the object to be scanned 10 by the upper cameras 3A and 3B and the lower cameras 4A and 4B, during the turning executed by the turning part 5, so as to capture multiple images (RGB images and depth images in the present embodiment).

Based on images of the AR markers 6 in the images captured by the upper cameras 3A and 3B and the lower cameras 4A and 4B, the relative position calculation unit 72 according to the present embodiment may calculate information on relative positions of the object to be scanned 10 with respect to the upper cameras 3A and 3B and the lower cameras 4A and 4B, corresponding to the respective items of the image information captured by the imaging control unit 71. Here, the relative position may include not only information on the coordinates of each camera, but also information on the attitude such as the tilt of the optical axis of the camera.

The model generation unit 73 according to the present embodiment may generate a three-dimensional model of the object to be scanned 10, based on the information on multiple images captured by the imaging control unit 71, and the information on the relative positions calculated by the relative position calculation unit 72.

Part or the entirety of the control device 7 may be implemented by any hardware components, software components, or a combination of these. The control device 7 may be primarily constituted with a microcomputer that includes, for example, one or more processors such as a CPU (Central Processing Unit), a RAM (Random Access Memory), a ROM (Read-Only Memory), an auxiliary storage device, and I/O (Input-Output) interfaces, to implement the various functions described above by executing various programs stored in the ROM and/or the auxiliary storage device on the processor.

The control device 7 may include multiple instance of the same components described above. Also, the control device 7 may be implemented, for example, on a single computer; or software may be installed on multiple computers, to cause the multiple computers to execute the same or different parts of processing of the software. In this case, a form of distributed computing may be adopted, in which each of the computers communicates via a network interface or the like to execute processing. In other words, the control device 7 may be configured as a system that implements the functions by one or more computers executing instructions stored in one or more storage devices. Also, the control device 7 may also be configured to process information transmitted from a terminal by one or more computers on the cloud, to transmit the result of the processing to the terminal.

Alternatively, the control device 7 may be configured by information processing of software (programs) executed by a CPU, GPU, or the like. In the case of being configured with information processing by software, software that implements at least some of the functions of the devices in the embodiment may be recorded on a non-transitory recording medium (non-transitory computer-readable medium) such as a flexible disk, a CD-ROM (Compact Disc Read-Only Memory), a USB (Universal Serial Bus) memory, or the like, and loaded into a computer to execute the information processing by the software. Also, the software may be downloaded via a communication network. Further, information processing may be executed by hardware by implementing the software in a circuit such as an ASIC (Application Specific Integrated Circuit), an FPGA (Field Programmable Gate Array), or the like.

The type of recording medium to record the software is not limited. The recording medium is not limited to a attachable/detachable medium such as a magnetic disk, an optical disk, or the like, and may be a fixed recording medium such as a hard disk, a memory, or the like. Also, the recording medium may be provided in the computer, or may be provided external to the computer.

The lights 8A and 8B according to the present embodiment are arranged on the top surface 2A side and on the bottom surface 2B side of the support table 2, respectively, to illuminate the object to be scanned 10. The lights 8A, 8B may be arranged in accordance with the installation positions of the upper cameras 3A and 3B and the lower cameras 4A and 4B, so as to eliminate shading on the surface of the object to be scanned 10, particularly in images captured by the upper cameras 3A and 3B and the lower cameras 4A and 4B.

Figure 3:
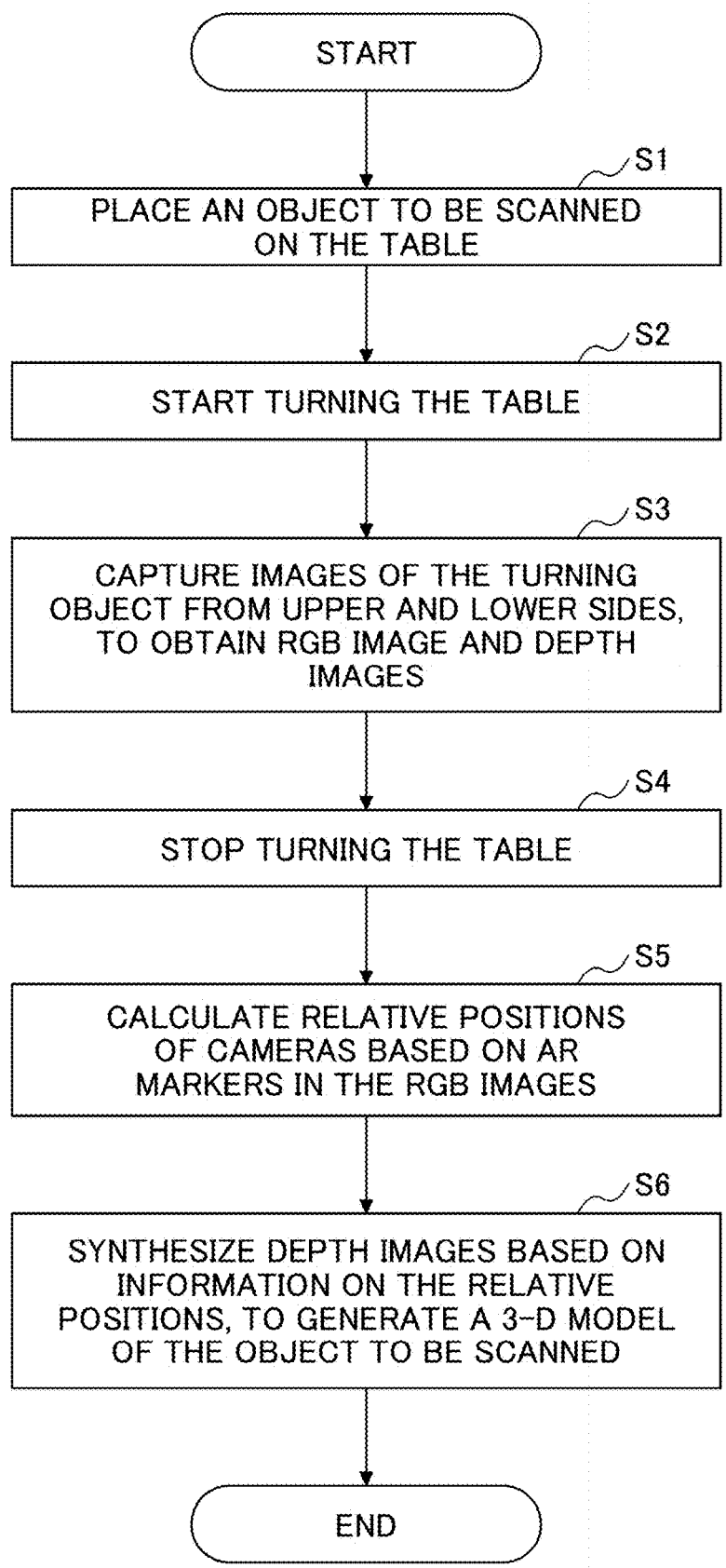
FIG. 3 is a flow chart illustrating steps of three-dimensional scanning processing executed by a three-dimensional scanning device according to an embodiment.
Figure 4:
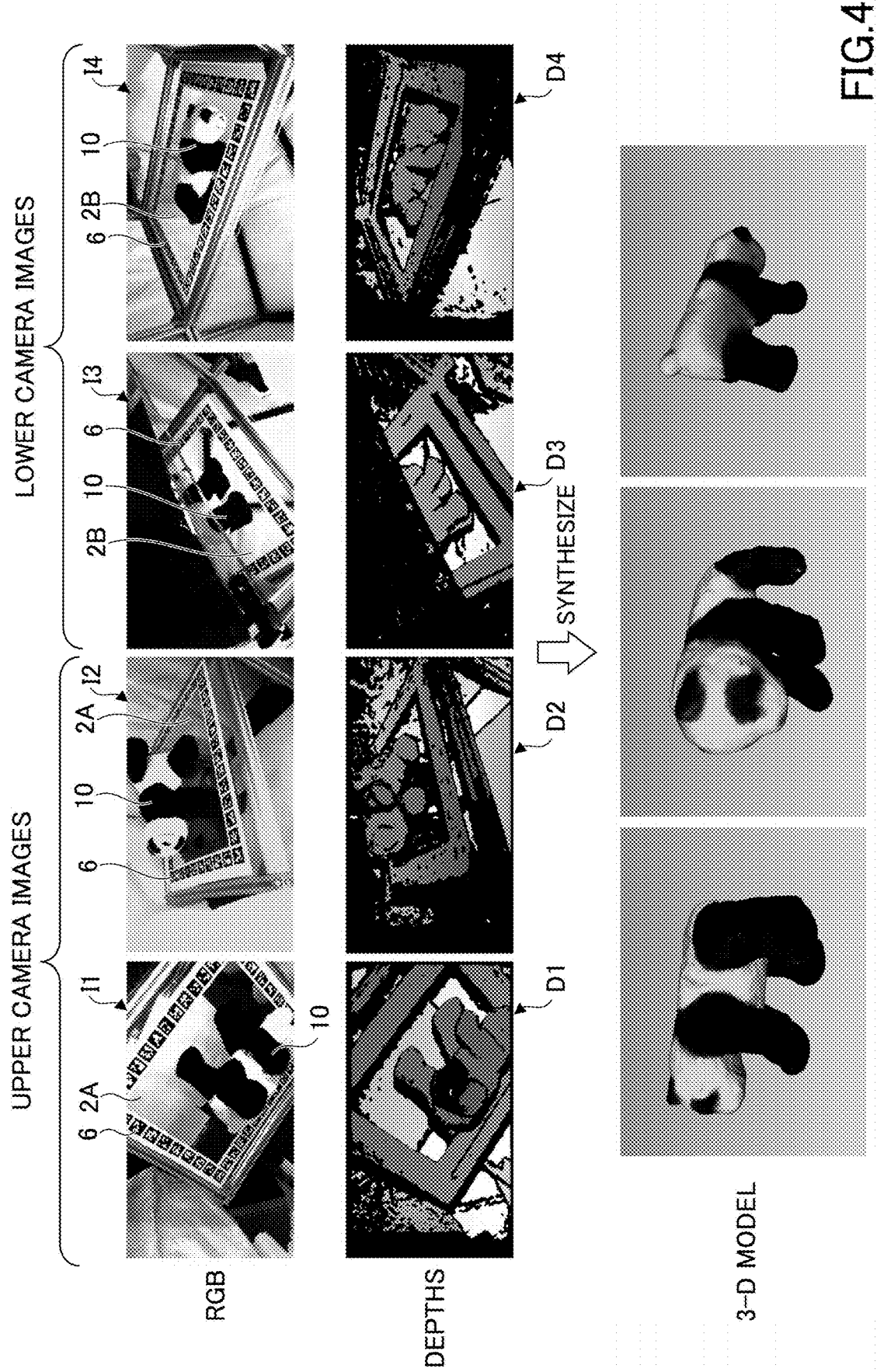
FIG. 4 is a diagram illustrating an example of a three-dimensional model generated in three-dimensional scanning processing.

Next, with reference to FIG. 3 and FIG. 4, a method of three-dimensional scanning according to an embodiment will be described. FIG. 3 is a flow chart illustrating steps of three-dimensional scanning processing executed by a three-dimensional scanning device 1 according to the embodiment. FIG. 4 is a diagram illustrating an example of a three-dimensional model generated in three-dimensional scanning processing. Processing of a flow chart in FIG. 3 is executed by the control device 7.

At Step S1, at the outset, the object to be scanned 10 may be placed on the top surface 2A of the support table 2. It is favorable that the placement position of the object to be scanned 10 includes the pivot of the support table 2. In the present embodiment, as illustrated in FIG. 1, the top surface 2A may be approximately circular, and may have the multiple AR markers 6 arranged at predetermined intervals on a circle that is approximately concentric with the outer edge of the top surface 2A; therefore, it is favorable that the placement position of the object to be scanned 10 is located at the center of the top surface 2A.

At Step S2, the imaging control unit 71 of the control device 7 may drive the turning part 5 to start a turning operation of the support table 2.

At Step S3 (image capturing step), the imaging control unit 71 may activate the upper cameras 3A and 3B and the lower cameras 4A and 4B, to capture images of the object to be scanned 10 both on the upper side and on the lower side, so as to obtain RGB images and depth images by the upper cameras 3A and 3B and the lower cameras 4A and 4B. The imaging control unit 71 may cause the upper cameras 3A and 3B and the lower cameras 4A and 4B to capture images at the same timing while the object to be scanned 10 is being turned around, and thereby, for example, as illustrated in the upper row in FIG. 4, RGB images I1 to I4 of the respective cameras can be obtained simultaneously when the object to be scanned 10 is located at any position among angles of rotation. Also, at this time, the imaging control unit 71 may also obtain depth images D1 to D4 of the respective cameras. The depth images D1 to D4 may be presented by point clouds in which pixels are colored depending on the distance from the camera to the surface of the object to be scanned 10, for example, as illustrated in the middle row in FIG. 4. In the example in FIG. 4, the depth images D1 to D4 are presented as darker as the distance is longer, and as brighter as the distance is shorter.

At Step S3, the imaging control unit 71 may continue image capturing to obtain images while the turning part 5 turns the object to be scanned 10 once. This enables the upper cameras 3A and 3B and the lower cameras 4A and 4B to capture images of the object to be scanned 10 at multiple positions along the turning direction, from the respective directions tilted at different angles with respect to the placement surface 2A, to obtain RGB images I1 to I4 and depth images D1 to D4 at the multiple positions. In other words, the imaging control unit 71 can scan the object to be scanned 10 simultaneously from the multiple directions using the multiple cameras. The imaging control unit 71 outputs the obtained images to the relative position calculation unit 72 and the model generation unit 73.

At Step S4, the imaging control unit 71 may cause the turning part 5 to stop the turning operation of the support table 2.

At Step S5 (relative position calculation step), the relative position calculation unit 72 of the control device 7 may calculate the relative positions of the upper cameras 3A and 3B and the lower cameras 4A and 4B with respect to the object to be scanned 10, based on images of the AR markers 6 in the RGB images I1 to I4.

The relative position calculation process at Step S5 will be described, taking the upper camera 3A as an example; the relative position calculation unit 72 may read, for example, information recorded on an AR marker 6 as an indicator reflected in the RGB image I1, to detect the angle of rotation of the marker with respect to the reference marker 6A. Also, the AR marker 6 may have a rectangular bit pattern in the present embodiment; therefore, the distance and angle of the upper camera 3A with respect to this AR marker 6 may be calculated according to a change in shape such as the degree of distortion in the image of this AR marker 6. Then, by integrating these information items, the position of the upper camera 3A with respect to the object to be scanned 10 can be calculated. As illustrated in FIG. 7, in the case where multiple AR markers are captured in the RGB image I1, for example, by calculating the relative position for each marker 6, and taking an average, information on the relative positions of the upper camera 3A may be finally calculated, based on information on the calculated multiple relative positions. Note that the calculation method of the relative positions of the other upper camera 3B and the lower cameras 4A and 4B may be substantially the same as described above. The relative position calculation unit 72 may output the information on the calculated relative positions to the model generation unit 73.

At Step S6 (model generation step), based on the information on the relative positions of the upper cameras 3A and 3B and the lower cameras 4A and 4B with respect to the object to be scanned 10 calculated at Step S5, the model generation unit 73 of the control device 7 may synthesize the depth images D1 to D4 of the object to be scanned 10 at the respective positions in the turning direction obtained at Step S3, to generate a three-dimensional model of the object to be scanned 10. For example, as illustrated in the lower row in FIG. 4, by generating a three-dimensional mesh model based on the depth images D1 to D4, and pasting a texture generated based on the RGB images I1 to I4 on the surface of the mesh model, a three-dimensional model with patterns and colors can be generated. The model generation unit 73 can store information on the generated three-dimensional model in the RAM and/or the auxiliary storage device of the control device 7. Upon completion of the processing at Step S6, the present control flow may end.

Note that the processing at Step S5 and the processing at Step S6 may be executed together, by using the RGB images I1 to I4 and the depth images D1 to D4 of the object to be scanned 10 at the positions in the turning direction obtained at Step S3. In other words, in the control device 7, the functions of the relative position calculation unit 72 and the model generation unit 73 may be integrated.

Next, effects of the three-dimensional scanning device 1 according to the present embodiment will be described.

For example, in the conventional three-dimensional scanner, in order to generate a three-dimensional model of an object to be scanned, it may be necessary to repeat scanning of the object to be scanned, by replacing the object in various orientations on the placement table. In contrast, the three-dimensional scanning device 1 according to the present embodiment may include the upper cameras 3A and 3B that are installed on the top surface 2A side of the support table 2 on which the object to be scanned 10 is placed, to capture images of the object to be scanned 10 in oblique directions with respect to the placement surface; and the lower cameras 4A and 4B installed on the bottom surface 2B side of the support table 2 to capture images of the object to be scanned 10 in oblique directions with respect to the placement surface. Then, the imaging control unit 71 of the control device 7 may scan the object to be scanned 10 in different directions by using the upper cameras 3A and 3B and the lower cameras 4A and 4B to capture multiple images, while the support table 2 is turning around to turn the object to be scanned 10 around.

With this configuration, by placing the object to be scanned 10 once on the placement surface and turning the object to be scanned 10 once, images of the object to be scanned 10 can be collectively captured in the upward and downward directions, especially in the oblique directions in which a large amount of information can be obtained, and along the entire circumference; therefore, operations of replacing and scanning the object in a variety of positions on the placement table as required in the conventional three-dimensional scanner become unnecessary, and thereby, the scanning time can be reduced, and a large amount of information on images can be efficiently captured within a short time. Therefore, the three-dimensional scanning device 1 according to the present embodiment can obtain image information on the object to be scanned 10 used for model generation faster; therefore, a three-dimensional model can be generated more rapidly. Also, the scanning can be performed by simply lacing the object to be scanned 10 in the vicinity of the center of the support table 2 (at least closer to the center side with respect to the AR markers 6), and there may be no need to precisely determine the installation position of the object to be scanned 10, and also, there may be no need to fix the object to be scanned 10; therefore, the scanning and model generation can be executed more easily. As a result, the three-dimensional scanning device 1 according to the present embodiment can generate a three-dimensional model in every direction more easily and rapidly.

Also, in the three-dimensional scanning device 1 according to the present embodiment, the upper cameras 3A and 3B and the lower cameras 4A and 4B may be RGB-D cameras; namely, include depth cameras, and information on images captured by the upper cameras 3A and 3B and the lower cameras 4A and 4B may include information on depth (depth) to the object to be scanned 10 obtained by the depth cameras. Accordingly, when generating a model from scanned images, the depth of the object to be scanned 10 can be obtained directly from the scanned images, and a process of calculating the depth to the surface of the object to be scanned 10 by using the scanned images may become unnecessary; therefore, the calculation cost of the model generation process can be reduced. As a result, the three-dimensional scanning device 1 according to the present embodiment can generate a three-dimensional model even faster.

Also, in the three-dimensional scanning device 1 according to the present embodiment, the AR markers 6 on the top surface 2A and on the bottom surface 2B of the support table 2 arranged around the placement position of the object to be scanned 10 may be used as relative position indicators. The relative position calculation unit 72 may calculate the relative position of each of the cameras with respect to the object to be scanned 10, based on images of the AR markers 6 in the RGB images I1 to I4 captured by the upper cameras 3A and 3B and the lower cameras 4A and 4B.

The relative position of each of the cameras with respect to the object to be scanned 10 may also be obtained by using a component that measures the angle of rotation of the object to be scanned 10, for example, by using an encoder for measuring the angle of rotation of the support table 2. However, a certain sensor for angle detection such the encoder may need to be provided separately. In the present embodiment, with the configuration described above, the relative position of each of the cameras with respect to the object to be scanned 10 can be calculated from the captured images; therefore, it may be not necessary to provide a sensor for angle detection separately, and the relative position can be obtained with a simpler configuration.

Also, in the present embodiment, the reference marker 6A as a reference position among the AR markers 6 on the top surface 2A, and the reference marker 6B as a reference position among the AR markers 6 on the bottom surface 2B may be provided, and these may be arranged at substantially the same position in the circumferential direction as illustrated in FIGS. 1 and 2. This may make the reference position common to information on images of the upper cameras 3A and 3B on the top surface 2A side, and information on images of the lower cameras 4A and 4B on the bottom surface 2B side; therefore, a relative position calculated by the relative position calculation unit 72 from images of the upper cameras 3A and 3B can be made common to that calculated from images of the lower cameras 4A and 4B. This may allow the image information on the top surface 2A side and the image information on the bottom surface 2B side to be synthesized as they are, without aligning positions in the circumferential direction. Accordingly, the calculation cost of the model generation process can be reduced, and generation of a three-dimensional model can be made faster. Also, as long as one of the AR markers 6 is captured in a camera image, the relative position can be calculated without precisely determining the installation position of the camera; therefore, calibration of the upper cameras 3A and 3B and the lower cameras 4A and 4B may not be required, and the device can be moved and installed easily.

Also, in the three-dimensional scanning device 1 according to the present embodiment, the support table 2 may be a transparent plate such as an acrylic plate; therefore, the object to be scanned 10 can be captured in images by the lower cameras 4A and 4B on the bottom surface 2B side as the backside.

Also, in the three-dimensional scanning device 1 according to the present embodiment, the upper cameras 3A and 3B and the lower cameras 4A and 4B may include multiple (two in FIG. 1) cameras set to have different angles in oblique directions; therefore, a greater amount of image information can be used for model generation, and thereby, the accuracy of three-dimensional model generation can be further improved. Here, "different angles in oblique directions" may mean that each of the upper camera 3A and the upper camera 3B has a distinct angle that is formed by a line segment connecting the pivot of the support table 2 at the center on the top surface 2A with the position of the camera in the obliquely upward direction, with respect to the top surface 2A. In the case of the lower cameras 4A and 4B, "different angles in oblique directions" may mean that each of the lower cameras 4A and 4B has a distinct angle that is formed by a line segment connecting the pivot of the support table 2 at the center on the bottom surface 2B with the position of the camera in the obliquely downward direction, with respect to the bottom surface 2B.

Also, in the three-dimensional scanning device 1 according to the present embodiment, lights 8A and 8B may be arranged on the top surface 2A and on the bottom surface 2B sides of the support table 2, respectively, to illuminate the object to be scanned 10; therefore, shading on the surface of the object to be scanned 10 can be reduced, and hues on the surface can be uniform in an image captured by each of the cameras. Therefore, the surface texture of a generated three-dimensional model can be set closer to the real object.

Figure 5:
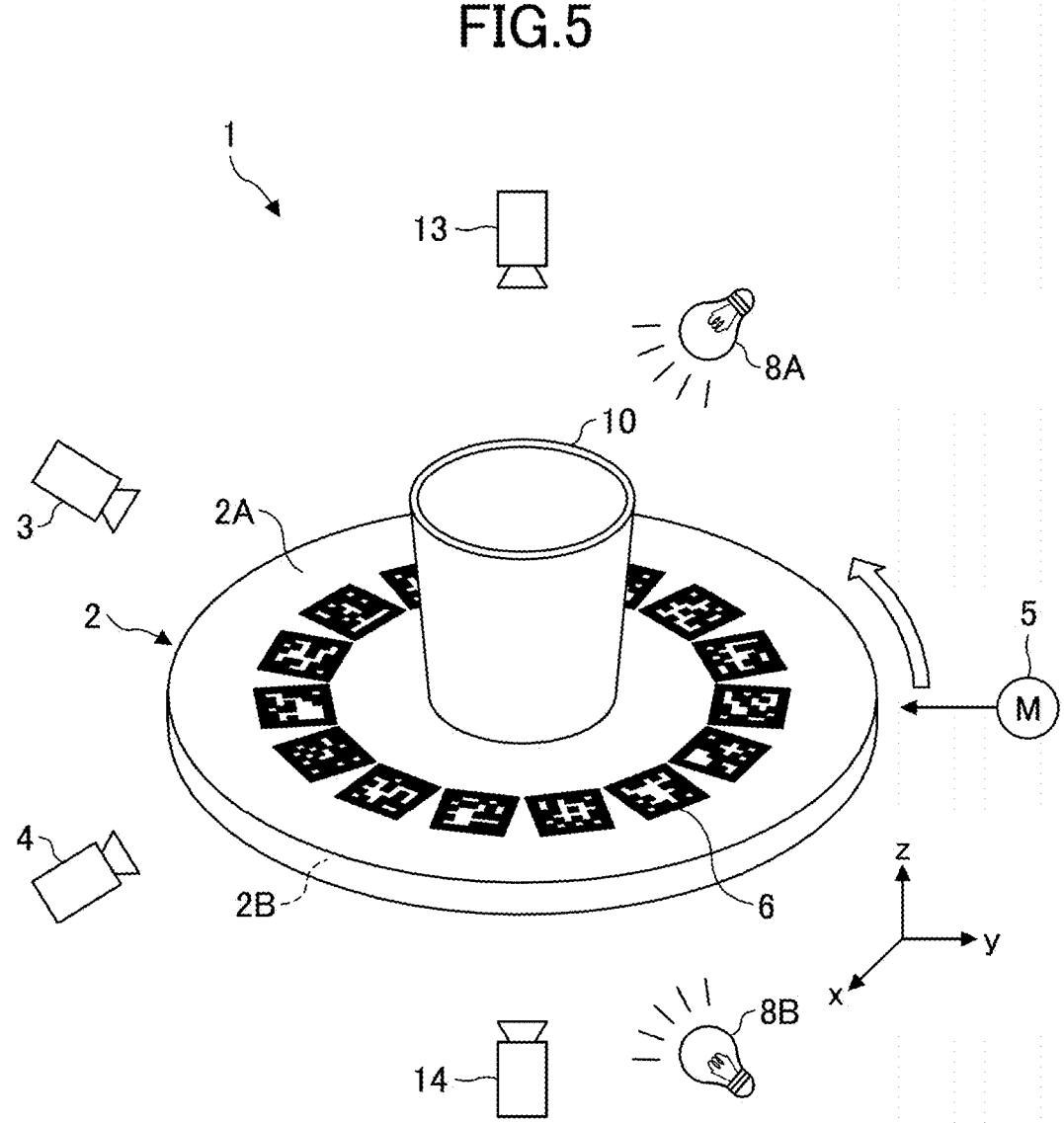
FIG. 5 is a schematic diagram illustrating a general configuration of a three-dimensional scanning device according to a modified example of an embodiment.

With reference to FIG. 5, a modified example will be described. FIG. 5 is a diagram illustrating a schematic configuration of a three-dimensional scanning device 1A according to a modified example of the embodiment. As illustrated in FIG. 5, in addition to a upper camera 3 and a lower camera 4, a three-dimensional scanning device may be configured to include a right overhead camera 13 (a third image sensor) that is installed at a position in a direction normal to the placement surface from the placement position of the object to be scanned 10 on the top surface 2A of the support table 2, namely, at a vertically upward position (in the z-axis positive direction); and a right underneath camera 14 (a fourth image sensor) that is installed in a direction opposite to the above normal direction, extending from the bottom surface 2B of the support table 2, namely, at vertically downward position (in the z-axis negative direction). It is favorable that the right overhead camera 13 and the right underneath camera 14 are also RGB-D cameras like the upper camera 3 and the lower camera 4.

In this way, by adopting a configuration that includes the right overhead camera 13 and the right underneath camera 14, even in the case where the object to be scanned 10 has a shape with an inner bottom surface that may be difficult to see in an image from an oblique direction, for example, the object to be scanned 10 being an object with a deep hollow such as a cup, the object can be reliably captured in images taken in the overhead or underneath direction. This feature can reduce blind spots on the surface of the object to be scanned 10, and thereby, the accuracy of three-dimensional model generation can be improved.

In the embodiment described above, as an example of the indicators related to the relative positions of the object to be scanned 10 with respect to the upper cameras 3A and 3B and the lower cameras 4A and 4B, the exemplified configuration has the multiple AR markers 6 arranged around the object to be scanned 10 according to the positions in the circumferential direction; however, other patterns such as, for example, two-dimensional bar codes may be used. Also, by using a sequence of pseudo-random numbers such as an M-sequence, annular patterns according to the angles of rotation may be provided.

In the embodiment described above, although the exemplified configuration has the multiple AR markers 6 arranged around the object to be scanned 10 at approximately uniform intervals around the entire circumference, at least one of the AR markers 6 may need to be present in images captured by the upper cameras 3A and 3B and the lower cameras 4A and 4B; therefore, in the case of having multiple AR markers 6 arranged, the markers may be arranged at non-uniform intervals.

In the embodiment described above, based on images of the AR markers 6 in RGB images, in the exemplified configuration, although the relative positions of the object to be scanned 10 with respect to the upper cameras 3A and 3B and the lower cameras 4A and 4B are calculated, the relative position may be calculated, for example, by providing an encoder arranged at the axis of rotation of the turning part 5 or the support table 2 to measure the angle of rotation, and using the measured angle of rotation as a relative position indicator.

In the embodiment described above, in the exemplified configuration, although the turning part 5 turns the support table 2 around, the turning part 5 simply needs to be capable of turning the support table 2 around relative to the upper cameras 3A and 3B and the lower cameras 4A and 4B; therefore, a configuration different from the embodiment may be adopted in which the support table 2 is fixed, and the upper cameras 3A and 3B and the lower cameras 4A and 4B are turned around the support table 2. In this case, the pivot and the axis of rotation are defined in accordance with the device that turns the cameras around.

In the embodiment described above, although the exemplified configuration includes two cameras of the upper cameras 3A and 3B, and two cameras of the lower cameras 4A and 4B, there may be, at least, one upper camera and one lower camera. Also, there may be three or more cameras. As the number of installed cameras increases, the accuracy of a three-dimensional model becomes higher.

In the embodiment described above, in the exemplified configuration, although the upper cameras 3A and 3B and the lower cameras 4A and 4B are RGB-D cameras that can capture RGB images and depth images, a configuration may be adopted in which the upper cameras 3A and 3B and the lower cameras 4A and 4B are RGB cameras to capture only RGB images. In this case, the model generation unit 73 can calculate information on depth of an object to be scanned, for example, by using multiple RGB images capture by the same camera at different angles of rotation.

The present embodiment may be further provided with a rendering unit that includes a renderer to assist generation of a three-dimensional model. By providing such a rendering unit, a more accurate three-dimensional model can be generated. Also, by using the renderer, in some cases, part of information used when constructing a three-dimensional model (e.g., information on depth) may be substituted. Also, by configuring this renderer by using a trained machine learning model, the accuracy of a three-dimensional model can be improved. The rendering unit may modify the three-dimensional model after the model generation unit 73 has generated a three-dimensional model, or may execute rendering before the model generation unit 73 completes the generation of the three-dimensional model, namely, during a course of generation.

In the embodiment described above, in the exemplified configuration, the top surface 2A of the support table 2 constituted with a transparent plate such as an acrylic plate is used as the placement surface, namely, the rigidity of the placement surface is higher than that of the object to be scanned 10, and the placement surface is substantially flat; however, the placement surface may need at least to allow the object to be scanned 10 to be captured (visible) also from the backside of the placement surface, and to be hardly visible in an image captured by a camera. In other words, the transparency of the member may simply need to reach a certain level at which information on the object to be scanned 10 can be obtained appropriately. The plate may be formed of a material through which an image of the object to be scanned 10 cannot be captured entirely, but has openings in the material through which an image of the object to be scanned 10 can be captured, such as a plate having holes pierced, a net, or the like. Also, for example, the placement surface may be formed of a material with a rigidity lower than the object to be scanned 10, such as a bag-like member including a material having a flexible shape, such as film, vinyl, net, liquid, or the like. In other words, the placement surface may be configured to be deformable in accordance with the shape of a placed object to be scanned 10. With this configuration, even in the case where the object to be scanned 10 is an object that deforms when placed on a soft acrylic plate at the contacting portion, for example, a stuffed toy, deformation of the object to be scanned 10 can be reduced when placed on the placement surface; therefore, a three-dimensional model in a state of reduced deformation due to the external force can be generated. If such a three-dimensional model is generated, for example, the three-dimensional model of the object to be scanned 10 can be used without noticeable differences even in a position of the three-dimensional model that is different from that taken while scanning, and thereby, the versatility of the three-dimensional model can be improved. Also, in the case where the support table 2 is not a transparent plate, the support table 2 may have another configuration other than the pedestal (e.g., a configuration in which a film having a placement surface is suspended from above).

As above, the present embodiment has been described with reference to specific examples. However, the present disclosure is not limited to these specific examples. Modifications of these specific examples designed by those skilled in the art appropriately are also covered in the scope of the present disclosure as long as the features in the present disclosure are provided. The elements and the arrangement, conditions, shapes, and the like of these provided in each of the specific examples described above, are not limited to those exemplified, and can be changed appropriately. Combinations of the elements provided in the specific examples described above can be changed appropriately unless technical inconsistency is introduced.

The upper cameras 3, the lower cameras 4, the right overhead camera 13, and the right underneath camera 14 may be elements other than camera devices, and may be, for example, smartphones.

In the embodiment described above, in the exemplified configuration, although the object to be scanned 10 placed on the top surface 2A of the support table 2 is simultaneously captured in images by using the upper cameras 3A and 3B and the lower cameras 4A and 4B, a configuration may be adopted in which only the lower cameras 4A and 4B are used. Also, the upper cameras 3A and 3B and the lower cameras 4A and 4B may capture images at different timings. In other words, the object to be scanned 10 may be captured in images by the lower cameras 4A and 4B after the object to be scanned 10 has been captured in images by the upper cameras 3A and 3B, or may be captured in the reversed order. By proving indicators as in the present embodiment, generation of a three-dimensional model can be facilitated based on images captured at such different timings. Also, the indicators allows image capturing to be executed with a single camera without preparing multiple cameras.

INDUSTRIAL APPLICABILITY

By using the three-dimensional scanning devices 1 and 1A according to the embodiment described above, a virtual space can be generated by scanning nearby objects, to use the virtual space as a simulator for machine learning such as task learning of robots. In other words, the three-dimensional scanning devices 1 and 1A according to the embodiment described above can be applied to a scanner device to generate a three-dimensional model for such a simulator. In other words, by using data obtained by the method of three-dimensional scanning according to the embodiment described above, data for machine learning or training data for machine learning can be generated. This training data can also be used for generate a machine learning model.

In order to generate such a virtual space for a simulator, it is necessary to scan a large number of objects to generate three-dimensional models; therefore, one may conjecture that an enormous scanning time would be required. However, the three-dimensional scanning devices 1 and 1A according to the embodiment described above can shorten the scanning time as described above, and thereby, can expedite generation of three-dimensional models; therefore, it can be considered advantageous to generate a virtual space for a simulator.

The invention claimed is:

1. A method of generating a three-dimensional model of a real object, the method comprising:
    imaging the real object placed on a transparent plate for which the three-dimensional model is to be generated and a first marker by at least a lower image sensor that is installed below the transparent plate from below the real object to capture an image including the real object and the first marker, said transparent plate being rotated together with the real object and the first marker relative to the at least the lower image sensor, or said lower image sensor being rotated relative to the transparent plate, the real object and the first marker;
    calculating position information of the lower image sensor based on at least a distortion of a shape of the first marker in the captured image including the real object and the first marker; and
    generating the three-dimensional model based on at least both (i) a first image, that is a part of the captured image including the real object and the first marker, of the real object and (ii) the calculated position information of the lower image sensor.

2. The method as claimed in claim 1, wherein the image is RGB data.

3. The method as claimed in claim 1, wherein the generating generates the three-dimensional model, by utilizing a machine learning model having been trained in such a manner that a generation accuracy of the three-dimensional model is improved.

4. The method as claimed in claim 1, wherein the three-dimensional model includes information on a surface of the real object obtained from the image.

5. The method as claimed in claim 4, wherein the information is at least one of surface texture, pattern, or color.

6. The method as claimed in claim 3, wherein the generating generates at least depths of the three-dimensional model without information on depths captured from the real object, by using the trained machine learning model.

7. The method as claimed in claim 3, wherein the machine learning model has been trained to generate at least information on depths of the three-dimensional model without information on depths of the real object.

8. A method of generating training data, the method comprising:
generating training data for machine learning, based on the three-dimensional model of the real object generated by the method as claimed in claim 1.

9. A method of generating a first machine learning model, the method comprising:
generating the first machine learning model by using the training data for machine learning generated by the method as claimed in claim 8.

10. The method as claimed in claim 1, wherein the imaging of the real object is performed utilizing a three-dimensional scanning device,
the three-dimensional scanning device including:
a transparent plate on which the real object to be imaged is placed and the first marker and a second marker are arranged; and
at least the lower image sensor and an upper image sensor installed below and above the transparent plate respectively, the lower image sensor imaging an underside of the real object placed on the transparent plate through the transparent plate and the upper image sensor imaging an upper side of the real object placed on the transparent plate and the second marker to capture an image including the real object and the second marker, wherein the first image and a second image of the real object in the image including the real object and the second marker are used to generate the three-dimensional model.

11. The method as claimed in claim 10, the method further comprising:
calculating information on a relative position of the real object, based on a plurality of images captured by the lower image sensor or the upper image sensor.

12. The method as claimed in claim 11, the method further comprising:
generating the three-dimensional model of the real object, based on the plurality of images and the information on the relative position calculated by the calculating.

13. The method as claimed in claim 10, wherein the lower image sensor installed below the transparent plate is configured to capture color information and depth information of the underside of the real object.

14. The three-dimensional model generated by the method of generating the three-dimensional model as claimed in claim 1.

15. Training data for machine learning generated by using the three-dimensional model generated by the method of generating the three-dimensional model as claimed in claim 1.

16. A machine learning model trained with training data for machine learning as claimed in claim 1.

17. The method as claimed in claim 10, further comprising rotating the real object by rotating the transparent plate on which the real object is being placed, wherein
the imaging images the underside and the upper side of the real object a plurality of times during the rotating in such a manner that the underside of the rotating real object is imaged from below by the lower image sensor from different angles and the upper side of the rotating real object is imaged from above by the upper image sensor from different angles.

18. The method as claimed in claim 3, wherein the generating of the three-dimensional model includes:
generating a first three-dimensional model; and
generating the three-dimensional model that has an accuracy better than the first three-dimensional model, based on a modifying process utilizing the generated first three-dimensional model and the machine learning model.

19. The method as claimed in claim 1, further comprising:
imaging the real object and a second marker by at least an upper image sensor from above to capture an image including the real object and the second marker; and
calculating position information of the upper image sensor based on at least a distortion of a shape of the second marker in the captured image including the real object and the second marker,
wherein the generating generates the three-dimensional model based on at least (i) the first image of the real object, (ii) the calculated position information of the lower image sensor, (iii) a second image, that is a part of the captured image including the real object and the second marker, of the real object, and (iv) the calculated position information of the upper image sensor.

20. The method as claimed in claim 1, wherein the position information of the lower image sensor is information on a relative position of the lower image sensor relative to the first marker.

21. The method as claimed in claim 1, wherein the first marker is arranged on the transparent plate.

22. A system used for generating a three-dimensional model of a real object comprising:
a transparent plate on which the real object is placed;
a first marker and a second marker arranged on the transparent plate so that an image of the first marker and an image of the second marker are captured from below and from above the transparent plate by a lower image sensor and an upper image sensor respectively, the first and second markers being configured to be used for calculating position information of the lower and the upper image sensors respectively; and
the lower image sensor and the upper image sensor installed below and above the transparent plate respectively, the lower image sensor being configured to capture a first image of an underside of the real object being placed on the transparent plate through the transparent plate with the image of the first marker and the upper image sensor being configured to capture a second image of an upper side of the real object being placed on the transparent plate with the image of the second marker,
wherein the position information of the lower and upper image sensors and the first and second images captured respectively by the lower and upper image sensors are used for generating the three-dimensional model of the real object.

23. The system as claimed in claim 22, wherein the at least one processor configured to generate at least depths of the three-dimensional model from the image without information on depths captured from the real object, by utilizing a machine learning model.

24. The system as claimed in claim 22, further comprising the at least one processor configured to generate the three-dimensional model.

25. The system as claimed in claim 22, further comprising a controller configured to control the transparent plate to rotate and the at least lower image sensor and the upper image sensor to capture images.

26. The system as claimed in claim 22, further comprising at least one processor configured to generate the three-dimensional mesh model of the real object based on the position information of the lower and upper image sensors and the first and second images captured respectively by the lower and upper image sensors.

27. An apparatus used for generating a three-dimensional model of a real object, comprising:
    at least one memory configured to store a program; and
    at least one processor configured to execute the program to:
        obtain at least a first captured image including an underside of the real object placed on a transparent plate and a first marker from below the real object by a lower image sensor installed below the transparent plate and a second captured image including an upper side of the real object placed on the transparent plate and a second marker from above the real object by an upper image sensor installed above the transparent plate, said transparent plate being rotated together with the real object, the first marker and the second marker relative to the lower image sensor and the upper image sensor, or said lower image sensor and the upper image sensor being rotated relative to the transparent plate, the real object, the first marker and the second marker;
    calculate first position information indicating where the first captured image has been captured from with respect to the first marker, based on at least a distortion of a shape of the first marker in the first captured image including the underside of the real object and the first marker;
    calculate second position information indicating where the second captured image has been captured from with respect to the second marker, based on at least a distortion of a shape of the second marker in the second captured image including the upper side of the real object and the second marker; and
    generate the three-dimensional model of the real object, based on at least (i) an image of the underside of the real object that is a part of the first captured image including the underside of the real object and the first marker, (ii) the first position information, (iii) an image of the upper side of the real object that is a part of the second captured image including the upper side of the real object and the second marker, and (iv) the second position information.

28. The apparatus as claimed in claim 27, wherein the first marker is arranged on the transparent plate.

* * * * *